United States Patent
Liu et al.

(10) Patent No.: US 11,745,274 B2
(45) Date of Patent: Sep. 5, 2023

(54) HOLE CHAMFERING DEVICE

(71) Applicant: CITIC Dicastal Co., Ltd., Qinhuangdao (CN)

(72) Inventors: Huiying Liu, Qinhuangdao (CN); Zuo Xu, Qinhuangdao (CN); Hanqi Wu, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 17/367,511

(22) Filed: Jul. 5, 2021

(65) Prior Publication Data
US 2022/0266354 A1    Aug. 25, 2022

(30) Foreign Application Priority Data
Feb. 22, 2021    (CN) .......................... 202110196803.9

(51) Int. Cl.
*B23B 51/10*    (2006.01)
(52) U.S. Cl.
CPC ............ *B23B 51/106* (2013.01); *B23B 51/10* (2013.01); *B23B 51/102* (2013.01); *B23B 2220/04* (2013.01); *Y10T 408/85895* (2015.01)
(58) Field of Classification Search
CPC ..... B23B 51/106; B23B 51/102; B23B 51/10; B23B 2220/04; Y10T 408/85895
See application file for complete search history.

(56) References Cited

U.S. PATENT DOCUMENTS

| | | | | |
|---|---|---|---|---|
| 79,276 A | * | 6/1868 | Sullivan | B23D 77/042 408/168 |
| 302,687 A | * | 7/1884 | Kellog | B23B 29/03417 408/168 |
| 709,275 A | * | 9/1902 | Neylon | B23B 29/03417 408/199 |
| 1,027,554 A | * | 5/1912 | Lugenbill | B23B 29/03417 408/168 |
| 3,853,422 A | * | 12/1974 | Benjamin | B23B 29/03417 408/179 |
| 4,544,309 A | * | 10/1985 | Krstovic | B23B 29/03417 408/168 |
| 4,712,951 A | * | 12/1987 | Brown | B23B 51/0018 606/81 |
| 5,181,810 A | * | 1/1993 | Heule | B23B 51/102 408/154 |
| 5,344,260 A | * | 9/1994 | Suzuki | B23B 29/03446 408/161 |

* cited by examiner

*Primary Examiner* — Eric A. Gates
*Assistant Examiner* — Reinaldo A Vargas Del Rio
(74) *Attorney, Agent, or Firm* — IPRO, PLLC

(57) ABSTRACT

The present disclosure belongs to the field of machining of chamfers of holes. The hole chamfering device includes blades in bilateral symmetry and a blade distance adjusting, through the blade distance adjusting, the distance between the blades on the left side and the right side can be adjusted, thus, after the blades on the left side and the right side of the hole chamfering device process chamfers on the front face of a hole, the distance between the blades is reduced to enable the blades to pass through the hole to process chamfers on the back face of the hole, after processing of the chamfers on the back face of the hole is completed, the distance between the blades is reduced, the hole chamfering device not only can chamfer the front face of the hole, but also can chamfer the back face of the hole.

4 Claims, 4 Drawing Sheets

HOLE CHAMFERING DEVICE

TECHNICAL FIELD

The present disclosure relates to the technical field of machining of chamfers of holes, in particular to a hole chamfering device.

BACKGROUND

After parts are machined, the front face of a hole generally needs to be chamfered and deburred, and the back face of the hole also needs to be chamfered and deburred. At present, the front face of a hole is mostly chamfered and deburred by adopting a chamfering drill or a rotational deburring knife, but professional tools for chamfering the back face of a hole are always lacked. A mounting hole of a control arm of an auxiliary frame is generally of a double-lug structure, the distance between lugs is quite small, and burrs on the back face of the mounting hole are quite difficult to remove, due to the particularity of the structure, no operation space exists for chamfering of the back face of the hole, a chamfering tool cannot be directly fed from the back face of the hole to remove the burrs, and only can be fed from the front face of the hole, and if existing equipment is used for interpolation and milling during machining, the machining rhythm is affected, and the efficiency is low.

SUMMARY

An embodiment of the present disclosure provides a hole chamfering device, which can solve the problems in the background, not only can chamfer the front face of a hole, but also can chamfer the back face of the hole, and is simple to operate, and is flexible and efficient.

In order to achieve the purpose, the present disclosure provides the following technical solution:

in the first aspect, an embodiment of the present disclosure provides a hole chamfering device, including blades in bilateral symmetry and a blade distance adjusting assembly, wherein the blades are double-cutting-edge blades, and each blade includes a first cutting edge inclined from outside to inside from top to bottom and a second cutting edge inclined from inside to outside from top to bottom; the blade distance adjusting assembly includes a first guide rail, a second guide rail, a first sliding block, a second sliding block, a spring and a V-shaped block, the first guide rail and the second guide rail are in bilateral symmetry, the first sliding block is mounted on the first guide rail, the second sliding block is mounted on the second guide rail, and the first sliding block and the second sliding block are connected with each other through the spring; the two blades are respectively mounted on the first sliding block and the second sliding block; and the V-shaped block is positioned between the first sliding block and the second sliding block, and two sides of the V-shaped block are respectively matched with the first sliding block and the second sliding block in a wedge-shaped mode.

In some embodiments, the blade distance adjusting assembly further includes a flange plate, a sleeve, a first pull rod, a second pull rod, a first sliding bead, a second sliding bead, a screw and a nut plate, the first guide rail and the second guide rail are mounted on the bottom face of the flange plate, and the sleeve is fixedly mounted on the top face of the flange plate; a threaded hole is formed in the middle of the nut plate, the screw is arranged in the threaded hole, and external threads of the screw are matched with internal threads of the threaded hole; the lower end of the screw is fixed on the sleeve; and a circle of annular slideway is arranged on the bottom face of the nut plate around the threaded hole, the first sliding bead and the second sliding bead are embedded in the annular slideway, the first sliding bead is fixedly connected with the first pull rod, the second sliding bead is fixedly connected with the second pull rod, two round holes are formed in the sleeve, and the first pull rod and the second pull rod pass through the round holes and a center hole of the flange plate, and are jointly connected to the V-shaped block.

In some embodiments, a handle is fixedly mounted at the top end of the screw, and a rocker is fixedly mounted on the nut plate.

In the second aspect, an embodiment of the present disclosure provides a hole chamfering device, including a first blade, a second blade, a third blade, a fourth blade and a blade distance adjusting assembly, wherein the first blade, the second blade, the third blade and the fourth blade are single-cutting-edge blades, the first blade and the third blade are in bilateral symmetry, the second blade and the fourth blade are in bilateral symmetry, the cutting edge of the first blade and the cutting edge of the third blade are inclined from inside to outside from top to bottom, and the cutting edge of the second blade and the cutting edge of the fourth blade are inclined from outside to inside from top to bottom; the blade distance adjusting assembly includes a first guide rail, a second guide rail, a first sliding block, a second sliding block, a spring and a V-shaped block, the first guide rail and the second guide rail are in bilateral symmetry, the first sliding block is mounted on the first guide rail, the second sliding block is mounted on the second guide rail, and the first sliding block and the second sliding block are connected with each other through the spring; the first blade and the second blade are mounted on the first sliding block, and the third blade and the fourth blade are mounted on the second sliding block; and the V-shaped block is positioned between the first sliding block and the second sliding block, and two sides of the V-shaped block are respectively matched with the first sliding block and the second sliding block in a wedge-shaped mode.

In some embodiments, the blade distance adjusting assembly further includes a flange plate, a sleeve, a first pull rod, a second pull rod, a first sliding bead, a second sliding bead, a screw and a nut plate, the first guide rail and the second guide rail are mounted on the bottom face of the flange plate, and the sleeve is fixedly mounted on the top face of the flange plate; a threaded hole is formed in the middle of the nut plate, the screw is arranged in the threaded hole, and external threads of the screw are matched with internal threads of the threaded hole; the lower end of the screw is fixed on the sleeve; and a circle of annular slideway is formed in the bottom face of the nut plate around the threaded hole, the first sliding bead and the second sliding bead are embedded in the annular slideway, the first sliding bead is fixedly connected with the first pull rod, the second sliding bead is fixedly connected with the second pull rod, two round holes are formed in the sleeve, and the first pull rod and the second pull rod pass through the round holes and a center hole of the flange plate, and are jointly connected to the V-shaped block.

In some embodiments, a handle is fixedly mounted at the top end of the screw, and a rocker is fixedly mounted on the nut plate.

Compared with the prior art, the present disclosure has the beneficial effects that:

the present disclosure provides the hole chamfering device, including blades in bilateral symmetry and a blade distance adjusting assembly, the distance between the blades on the left side and the right side can be adjusted through the blade distance adjusting assembly, after the blades on the left side and the right side of the hole chamfering device process chamfers on the front face of a hole, the distance between the blades is reduced to enable the blades to pass through the hole to process chamfers on the back face of the hole, after processing of the chamfers on the back face of the hole is completed, the distance between the blades is reduced again to enable the blades to be withdrawn from the hole, the hole chamfering device not only can chamfer the front face of the hole, but also can chamfer the back face of the hole, and is skillful in design and simple to operate, and has quite high practical application value.

DETAILED DESCRIPTION OF THE EMBODIMENTS

Embodiment 1

Figure 1:
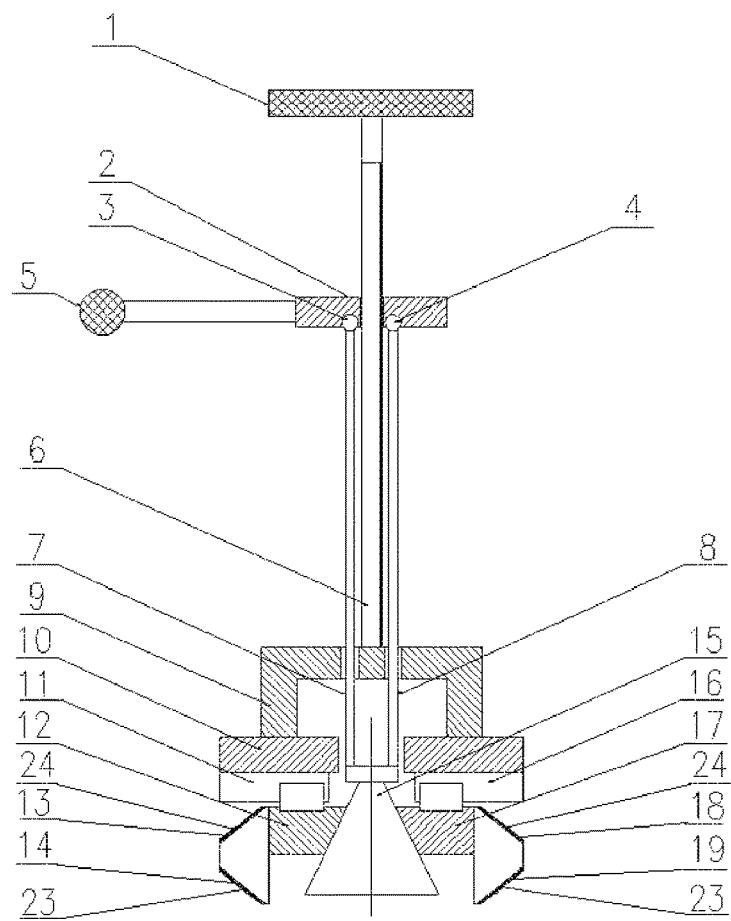
FIG. 1 is a structural schematic diagram of a hole chamfering device according to the present disclosure.
Figure 2:
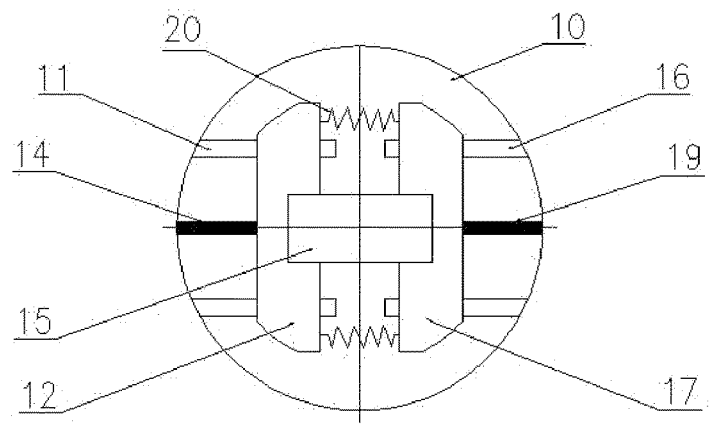
FIG. 2 is a bottom view of the hole chamfering device according to the present disclosure.

The embodiment 1 provides a hole chamfering device, as shown in FIG. 1 to FIG. 2, the hole chamfering device includes a first blade 13, a second blade 14, a third blade 18, a fourth blade 19 and a blade distance adjusting assembly.

The first blade 13, the second blade 14, the third blade 18 and the fourth blade 19 are single-cutting-edge blades. A first blade group includes the first blade 13 and the second blade 14, and a second blade group includes the third blade 18 and the fourth blade 19. The first blade 13 and the third blade 18 are in bilateral symmetry about the central axis of a screw 6, and the second blade 14 and the fourth blade 19 are in bilateral symmetry about the central axis of the screw 6. The cutting edge 24 (second cutting edge) of the first blade 13 and the cutting edge 24 (second cutting edge) of the third blade 18 are inclined from inside to outside from top to bottom, and the cutting edge 23 (first cutting edge) of the second blade 14 and the cutting edge 23 (first cutting edge) of the fourth blade 19 are inclined from outside to inside from top to bottom.

The blade distance adjusting assembly includes a flange plate 10, a sleeve 9, a first pull rod 7, a second pull rod 8, a first sliding bead 3, a second sliding bead 4, a rocker 5, a screw 6, a nut plate 2, a handle 1, a first guide rail 11, a second guide rail 16, a first sliding block 12, a second sliding block 17, springs 20 and a V-shaped block 15. The first guide rail 11 and the second guide rail 16 are mounted on the bottom face of the flange plate 10, and the sleeve 9 is fixedly mounted on the top face of the flange plate 10. A threaded hole is formed in the middle of the nut plate 2, the screw 6 is arranged in the threaded hole, and external threads of the screw 6 are matched with internal threads of the threaded hole. The rocker 5 is fixedly mounted on the nut plate 2. The handle 1 is fixedly mounted at the top end of the screw 6, and the lower end of the screw 6 is fixed on the sleeve 9. A circle of annular slideway is arranged on the bottom face of the nut plate 2 around the threaded hole, and the first sliding bead 3 and the second sliding bead 4 are embedded in the annular slideway. The first sliding bead 3 is fixedly connected with the first pull rod 7, and the second sliding bead 4 is fixedly connected with the second pull rod 8. Two round holes are formed in the sleeve 9, and the first pull rod 7 and the second pull rod 8 pass through the round holes and a center hole of the flange plate 10, and are jointly connected to the V-shaped block 15. The first guide rail 11 and the second guide rail 16 are mounted on the flange plate 10 in a bilateral symmetry mode, the first sliding block 12 is mounted on the first guide rail 11, the second sliding block 17 is mounted on the second guide rail 16, and the first sliding block 12 and the second sliding block 17 are connected with each other through the springs 20. The first blade 13 and the second blade 14 are mounted on the first sliding block 12, and the third blade 18 and the fourth blade 19 are mounted on the second sliding block 17. The V-shaped block 15 is positioned between the first sliding block 12 and the second sliding block 17, and two sides of the V-shaped block 15 are respectively matched with the first sliding block 12 and the second sliding block 17 in a wedge-shaped mode.

A principle of adjusting the distance between the blades on the two sides by the blade distance adjusting assembly in the embodiment 1 is as follows: when the rocker 5 drives the nut plate 2 to rotate, under the action of threaded fit, the nut plate 2 applies a vertical tensile force to the first pull rod 7 and the second pull rod 8 so as to drive the V-shaped block 15 to ascend, the V-shaped block 15 drives the first sliding block 12 and the second sliding block 17 to enable the distance between the first sliding block 12 and the second sliding block 17 to be increased, then the distance between the first blade 13 and the third blade 18 can be adjusted, and the distance between the second blade 14 and the fourth blade 19 can be adjusted; and when the rocker 5 is rotated reversely, under the action of threaded fit, the nut plate 2 applies vertical pressure to the first pull rod 7 and the second pull rod 8 so as to drive the V-shaped block 15 to descend, and under the action of a contracting force of the springs 20, the distance between the first sliding block 12 and the second sliding block 17 is reduced, so that the first sliding block 12 and the second sliding block 17 can be restored to be in the initial state.

Figure 3:
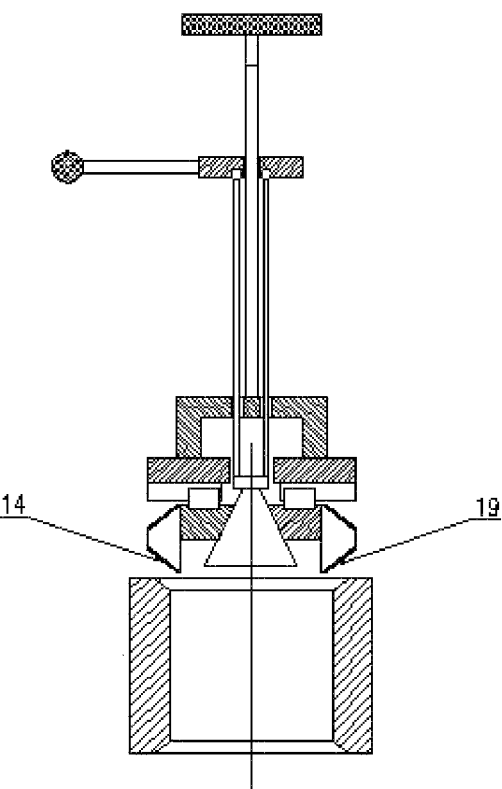
FIG. 3 is a schematic diagram of the hole chamfering device which processes chamfers on the front face of a hole according to the present disclosure.
Figure 4:
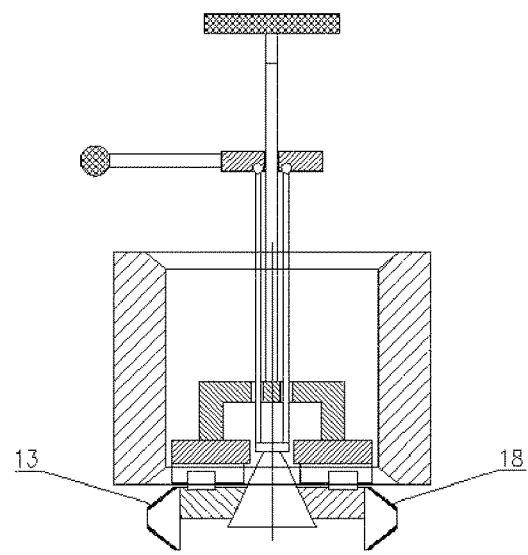
FIG. 4 is a schematic diagram of the hole chamfering device which processes chamfers on the back face of the hole according to the present disclosure.

As shown in FIG. 3 to FIG. 4, in the working process of the hole chamfering device in the embodiment, when the front face of a hole is chamfered, the distance between the second blade 14 and the fourth blade 19 is adjusted through the rocker 5 firstly, then the hole chamfering device is directly fed from the front face of the hole, and the handle 1 is held to rotate the device by a circle so as to complete chamfering on the front face of the hole; and when the back face of the hole is chamfered, the handle 1 is held firstly, the device is inserted into the hole to enable the first blade 13 and the third blade 18 to pass through the back face of the hole, then the distance between the first blade 13 and the third blade 18 is adjusted through the rocker 5 to be matched with the distance between chamfers to be processed on the back face of the hole, the handle 1 is held to pull up the device to enable the first blade 13 and the third blade 18 to make contact with the edge of the wall of the back face of the hole, then the device is rotated by a circle to complete chamfering on the back face of the hole, the distance between the first blade 13 and the third blade 18 is adjusted through the rocker 5 to restore the first blade 13 and the third blade 18, and the device is withdrawn from the hole.

The embodiment 1 provides the hole chamfering device which not only can chamfer the front face of the hole, but also can chamfer the back face of the hole, is skillful in design and simple to operate, is improved in hole chamfering efficiency, and has quite high practical application value.

Embodiment 2

Figure 5:
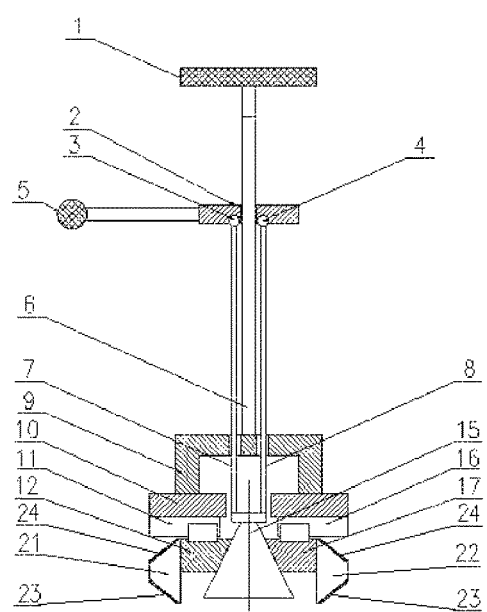
FIG. 5 is a structural schematic diagram of a hole chamfering device according to another embodiment of the present disclosure.
Figure 6:
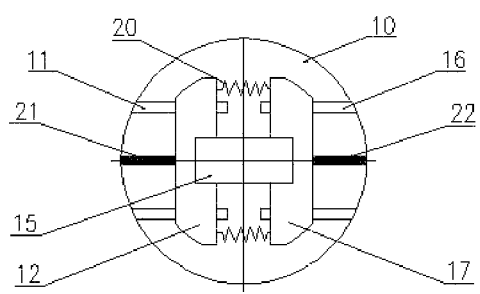
FIG. 6 is a bottom view of the hole chamfering device according to another embodiment of the present disclosure; wherein: 1—handle, 2—nut plate, 3—first sliding bead, 4—second sliding bead, 5—rocker, 6—screw, 7—first pull rod, 8—second pull rod, 9—sleeve, 10—flange plate, 11—first guide rail, 12—first sliding block, 13—first blade, 14—second blade, 15—V-shaped block, 16—second guide rail, 17—second sliding block, 18—third blade, 19—fourth blade, 20—spring, 21—fifth blade, 22—sixth blade, 23—first cutting edge, and 24—second cutting edge.

The embodiment 2 provides a hole chamfering device, as shown in FIG. 5 to FIG. 6, the hole chamfering device includes a fifth blade 21 and a sixth blade 22 which are in bilateral symmetry as well as a blade distance adjusting assembly, wherein the fifth blade 21 and the sixth blade 22 are double-cutting-edge blades. The fifth blade 21 can be regarded as a first blade group, and the sixth blade 22 can be regarded as a second blade group. The fifth blade 21 and the sixth blade 22 each include a first cutting edge 23 inclined from outside to inside from top to bottom and a second cutting edge 24 inclined from inside to outside from top to bottom.

The blade distance adjusting assembly includes a flange plate 10, a sleeve 9, a first pull rod 7, a second pull rod 8, a first sliding bead 3, a second sliding bead 4, a rocker 5, a screw 6, a nut plate 2, a handle 1, a first guide rail 11, a second guide rail 16, a first sliding block 12, a second sliding block 17, springs 20 and a V-shaped block 15. The first guide rail 11 and the second guide rail 16 are mounted on the bottom face of the flange plate 10, and the sleeve 9 is fixedly mounted on the top face of the flange plate 10. A threaded hole is formed in the middle of the nut plate 2, the screw 6 is arranged in the threaded hole, and external threads of the screw 6 are matched with internal threads of the threaded hole. The rocker 5 is fixedly mounted on the nut plate 2. The handle 1 is fixedly mounted at the top end of the screw 6, and the lower end of the screw 6 is fixed on the sleeve 9. A circle of annular slideway is arranged on the bottom face of the nut plate 2 around the threaded hole, and the first sliding bead 3 and the second sliding bead 4 are embedded in the annular slideway. The first sliding bead 3 is fixedly connected with the first pull rod 7, and the second sliding bead 4 is fixedly connected with the second pull rod 8. Two round holes are formed in the sleeve 9, and the first pull rod 7 and the second pull rod 8 pass through the round holes and a center hole of the flange plate 10, and are jointly connected to the V-shaped block 15. The first guide rail 11 and the second guide rail 16 are mounted on the flange plate 10 in a bilateral symmetry mode, the first sliding block 12 is mounted on the first guide rail 11, the second sliding block 17 is mounted on the second guide rail 16, and the first sliding block 12 and the second sliding block 17 are connected with each other through the springs 20. The fifth blade 21 is mounted on the first sliding block 12, and the sixth blade 22 is mounted on the second sliding block 17. The V-shaped block 15 is positioned between the first sliding block 12 and the second sliding block 17, and two sides of the V-shaped block 15 are respectively matched with the first sliding block 12 and the second sliding block 17 in a wedge-shaped mode.

A principle of adjusting the distance between the blades on two sides by the blade distance adjusting assembly in the embodiment 2 is as follows: when the rocker 5 drives the nut plate 2 to rotate, under the action of threaded fit, the nut plate 2 applies a vertical tensile force to the first pull rod 7 and the second pull rod 8 so as to drive the V-shaped block 15 to ascend, and the V-shaped block 15 drives the first sliding block 12 and the second sliding block 17 to enable the distance between the first sliding block 12 and the second sliding block 17 to be increased, so that the distance between the fifth blade 21 and the sixth blade 22 can be adjusted, and the distance between the cutting edges of the two blades can be adjusted; and when the rocker 5 is rotated reversely, under the action of threaded fit, the nut plate 2 applies vertical pressure to the first pull rod 7 and the second pull rod 8 so as to drive the V-shaped block 15 to descend, and under the action of the contracting force of the springs 20, the distance between the first sliding block 12 and the second sliding block 17 is reduced, so that the first sliding block 12 and the second sliding block 17 can be restored to be in the initial state.

In the working process of the hole chamfering device in the embodiment, when the front face of a hole is chamfered, the distance between the fifth blade 21 and the sixth blade 22 is adjusted through the rocker 5 firstly, then the hole chamfering device is directly fed from the front face of the hole by utilizing the first cutting edges inclined from outside to inside from top to bottom, and the handle 1 is held to rotate the device by a circle so as to complete chamfering of the front face of the hole; and when the back face of the hole is chamfered, the handle 1 is held firstly, the device is inserted into the hole to enable the fifth blade 21 and the sixth blade 22 to pass through the back face of the hole, then the distance between the fifth blade 21 and the sixth blade 22 is adjusted through the rocker 5 to be matched with the distance between chamfers to be processed on the back face of the hole, the handle 1 is held to pull up the device to enable the second cutting edges, which are inclined from inside to outside from top to bottom, of the fifth blade 21 and the sixth blade 22 to make contact with the edge of the wall of the back face of the hole, then the device is rotated by a circle to complete chamfering of the back face of the hole, the distance between the fifth blade 21 and the sixth blade 22 is adjusted through the rocker 5 to restore the fifth blade 21 and the sixth blade 22, and the device is withdrawn from the hole.

The embodiment 2 provides the hole chamfering device which not only can chamfer the front face of a hole, but also can chamfer the back face of the hole, is skillful in design and simple to operate, is improved in hole chamfering efficiency, and has quite high practical application value.

What is claimed is:

1. A hole chamfering device comprising a first blade group, a second blade group and a blade distance adjusting assembly, wherein
the first blade group and the second blade group are in bilateral symmetry,
each of the first blade group and the second blade group comprises a first cutting edge inclined from outside to inside from top to bottom and a second cutting edge inclined from inside to outside from top to bottom;
the blade distance adjusting assembly comprises a first guide rail, a second guide rail, a first sliding block, a second sliding block, a spring and a V-shaped block, the first guide rail and the second guide rail are in bilateral symmetry, the first sliding block is mounted on the first guide rail, the second sliding block is mounted on the second guide rail, and the first sliding block and the second sliding block are connected with each other through the spring;

the first blade group is mounted on the first sliding block, and the second blade group is mounted on the second sliding block;

the V-shaped block is positioned between the first sliding block and the second sliding block, and two sides of the V-shaped block are respectively matched with the first sliding block and the second sliding block in a wedge-shaped mode;

the blade distance adjusting assembly further comprises a flange plate, a sleeve, a first pull rod, a second pull rod, a first sliding bead, a second sliding bead, a screw and a nut plate, the first guide rail and the second guide rail are mounted on a bottom face of the flange plate, and the sleeve is fixedly mounted on a top face of the flange plate;

a threaded hole is formed in the middle of the nut plate, the screw is arranged in the threaded hole, and external threads of the screw are matched with internal threads of the threaded hole; a lower end of the screw is fixed on the sleeve; and a circle of annular slideway is arranged on a bottom face of the nut plate around the threaded hole, the first sliding bead and the second sliding bead are embedded in the annular slideway, the first sliding bead is fixedly connected with the first pull rod, the second sliding bead is fixedly connected with the second pull rod, two round holes are formed in the sleeve, and the first pull rod and the second pull rod pass through the round holes and a center hole of the flange plate, and are jointly connected to the V-shaped block.

2. The hole chamfering device according to claim 1, wherein a handle is fixedly mounted at a top end of the screw, and a rocker is fixedly mounted on the nut plate.

3. The hole chamfering device according to claim 1, wherein the first blade group comprises a first blade and a second blade, the second blade group comprises a third blade and a fourth blade, wherein the first blade, the second blade, the third blade and the fourth blade are single-cutting-edge blades, the first blade and the third blade are in bilateral symmetry, the second blade and the fourth blade are in bilateral symmetry, the first cutting edge of the first blade group is on the first blade, and the second cutting edge of the first blade group is on the second blade, the first cutting edge of the second blade group is on the third blade, and the second cutting edge of the second blade group is on the fourth blade.

4. The hole chamfering device according to claim 1, wherein each of the first blade group and the second blade group comprises a double-cutting-edge blade having the first cutting edge and the second cutting edge.

* * * * *